P. Hinds,
Cant Dog
No. 26,737.  Patented Jan. 3, 1860.
Fig. 1
Fig. 3
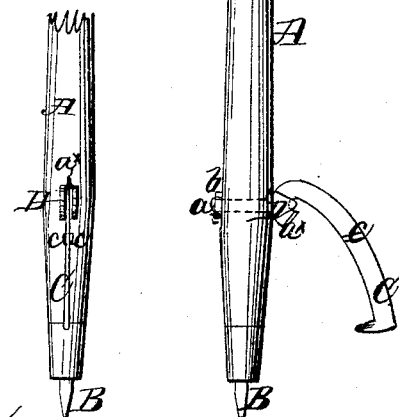
Fig. 2
Witnesses:
Jerediah Black
D. B. Gifford
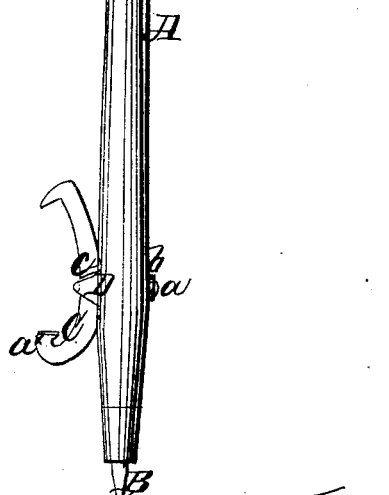
Inventor:
Peter Hinds

UNITED STATES PATENT OFFICE.

PETER HINDS, OF CEDAR RUN, PENNSYLVANIA, ASSIGNOR TO HIMSELF AND W. VAN NAME, OF SAME PLACE.

CANT-HOOK.

Specification of Letters Patent No. 26,737, dated January 3, 1860.

*To all whom it may concern:*

Be it known that I, PETER HINDS, of Cedar Run, in the county of Lycoming and State of Pennsylvania, have invented a new and useful Improvement in Cant-Hooks; and I do hereby declare that the following is a full, clear, and exact description of the same, reference being had to the annexed drawings, making a part of this specification, in which—

Figures 1, 2, and 3, are elevations of my invention, Figs. 1, and 2, showing the implement as used for a cant-hook, and Fig. 3, showing it as used for a simple lever.

Similar letters of reference indicate corresponding parts in the several figures.

This invention consists in attaching the hook to the handle in such a manner that the hook and handle may be used when required in the ordinary way and when the hook is not designed for use, the latter being capable of being so adjusted as to be out of the way and the handle used as an ordinary lever.

The invention is designed chiefly for the use of lumbermen and others who require both a cant-hook and lever in performing their work and to whom therefore the within described invention will prove a great acquisition, saving time and the expense of one implement, as by my invention the two tools above named are advantageously combined.

To enable those skilled in the art to fully understand, construct and use my invention I will proceed to describe it.

A, represents the handle of the implement which may be of wood provided with a ferrule and spike B, at its lower end precisely as in the ordinary cant-hook.

C, is the hook which is of cast steel, at least that would be the preferable material. This hook is also of the usual form but it is attached to the handle A, in a novel way, as follows: A metal socket D, is attached to the handle A, by means of a tang $a$, which passes transversely through the handle and has a screw nut $b$, on its outer end. In this socket D, the hook C, is fitted and allowed to slide freely. The upper end of the hook C, is formed with a short curve $a^x$, which catches over the outer end of the socket when the hook is in use, or in a position to be used, and retains the hook in its proper working position as shown in Fig. 1. When the hook is in this position the implement is used precisely like an ordinary cant-hook and its operation is precisely the same.

The hook C, at about its center has a ledge or projection $c$, at each side of it. These ledges or projections will not permit the hook to slide freely through the socket D, they serve as hold fasts so that if the hook be inverted from a working position it will slide down through the socket until caught and retained by the ledges or projections $c$, as shown clearly in Fig. 3. When the hook is in this position it will be out of the way and the handle A, may be used as a simple lever. In order to invert the hook C, all that is required is to elevate the handle A, so that the hook will fall back into a position that will admit of its assuming, by its over gravity when the handle is lowered, the position shown in Fig. 3.

The simple hand lever is an implement much used in connection with the cant-hook, and by the within described simple invention the two implements are combined so that either may be used equally as efficiently as if they were made separately.

Having thus described my invention what I claim as new and desire to secure by Letters Patent, is—

Attaching or connecting the hook C, to the handle A, by means of the socket D, the hook being provided with the curve $a^x$, at one end and the ledges $c$, at its center substantially as shown to admit of the two adjustments of the hook for the purpose specified.

PETER HINDS.

Witnesses:
JERMIAH BLACK,
D. B. GIFFORD.